United States Patent [19]

Dohan et al.

[11] Patent Number: 5,783,873
[45] Date of Patent: Jul. 21, 1998

[54] MAGNETIC COUPLING-TYPE COMMUNICATION BUS ARCHITECTURE

[75] Inventors: Yves Dohan, Paris; Mekki Boussairy, Change; Patick Leger, Mulsanne, all of France

[73] Assignee: Framatome Connectors International, Courbevoie, France

[21] Appl. No.: 627,304

[22] Filed: Apr. 3, 1996

[30] Foreign Application Priority Data

Apr. 3, 1995 [FR] France .................... 95 03878

[51] Int. Cl.[6] .................................. H01F 38/14
[52] U.S. Cl. .......................... 307/104; 439/950
[58] Field of Search ................ 307/104, 9.1; 333/177;
174/35 R, 51, 68.2, 126.1; 439/939, 950,
607, 608, 610, 34, 212, 213; 336/DIG. 2;
340/854.8, 310.07; 455/41

[56] References Cited

U.S. PATENT DOCUMENTS

| | | | |
|---|---|---|---|
| 1,870,625 | 8/1932 | Hellwig | 336/DIG. 2 |
| 4,038,625 | 7/1977 | Tompkins et al. | 336/DIG. 2 |
| 4,902,989 | 2/1990 | Glaab . | |
| 5,229,692 | 7/1993 | Hough | 307/104 |

FOREIGN PATENT DOCUMENTS

| | | |
|---|---|---|
| 0043065 A1 | 1/1982 | European Pat. Off. . |
| 2589660 A1 | 5/1987 | France . |
| 2693289 A1 | 1/1994 | France . |
| 2142480 | 1/1985 | United Kingdom . |
| WO 91/14324 | 9/1991 | WIPO . |

OTHER PUBLICATIONS

Yukinori, "Bus System With Contactless Coupler", Patent Abstracts of Japan, vol. 13, No. 437 (E–826), Sep. 29, 1989.

*Primary Examiner*—Richard T. Elms
*Attorney, Agent, or Firm*—Pollock, Vande Sande & Priddy

[57] ABSTRACT

The architecture concerns a bus (BCM) incorporating magnetic coupling. The bus is structured in sections ($S_{i-1}$, $S_i$). The "coupler" elements ($B_i$) are disassociated from the "cable" elements ($C_{b,i-1}$, $C_{b,i}$) of the bus ($B_{CM}$). The couplers ($B_i$) themselves comprise a magnetic coupling module (1), constituted by passive elements, and an interface module (2) incorporating electronic interface circuits between the magnetic coupling module (1) and the subscribers ($U_i$) by means of supplementary cables ($C_{a,i}$). According to a first variant, the modules (1, 2) consist of single casings (10, 20) used as is or placed in a cascade configuration. According to a second embodiment, the modules are multiple and are placed in casings containing rectangular connectors for interconnection between casings.

17 Claims, 8 Drawing Sheets

FIG_3

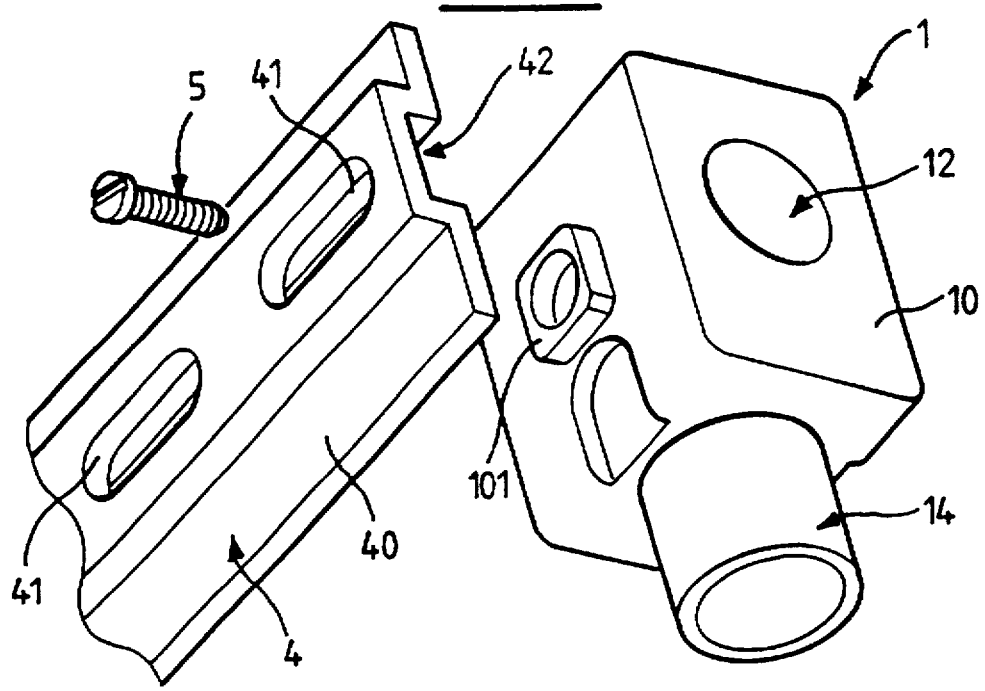
FIG_8

MAGNETIC COUPLING-TYPE COMMUNICATION BUS ARCHITECTURE

FIELD OF THE INVENTION

The invention concerns a magnetic coupling-type communication bus architecture. The invention is usable, in particular, in the aeronautics and aerospace fields.

BACKGROUND OF THE INVENTION

Numerous types of buses are known. Mention may be made, by way of example, of series- or parallel-type buses which carry digital signals between the various units belonging to a data-processing system, e.g., a microcomputer; buses connecting these data-processing devices together in a "Y" configuration, in a loop, etc.; or again, magnetic loops.

There exist de facto standards describing these buses, i.e., "ETHERNET," "TOKEN RING," "IEEE," etc.

Whatever the type of bus considered, there exists the need to transmit increasingly greater quantities of data, thereby requiring high transmission frequencies. Technological advances in fact make it possible to achieve the requisite high frequencies, currently from 10 to 100 MHZ.

It is well known that, at these frequencies, the characteristic impedance of the transmission line formed by the bus must be uniform along the entire length of the line. If not, the formation of interference returns and standing waves is observed. In addition to its characteristic impedance, one of the important parameters characterizing a transmission line is the standing wave rate. This phenomenon produces, most notably, energy losses, and may cause serious disruptions, i.e., interference signals.

The bus must also be protected from magnetic interference existing in the ambient environment (electromagnetic compatibility). Protection must be extended to include interference capacitive couplings, radiation protection, etc.

In the aforementioned areas, this magnetic or capacitive interference may be highly pronounced, especially since these buses currently extend over several tens of meters. In addition, the buses are subjected to adverse conditions: wide temperature variations, humidity, vibrations, etc.

The electronic systems used in modern avionics are extremely complex: various measuring devices, control devices, etc. It will be easily understood that reliability is an important factor, whether from the perspective of "integrity" (non-corruption of the transmitted data) or of "availability" (continuity of service, even in the event of severe external interference, e.g., lightning striking the airplane). Interference in signal transmission on the bus may, in fact, produce disastrous situations.

In this type of application, buses using a magnetic coupling have been suggested. Generally speaking, the bus comprises a "spine," to which are connected various subsystems of electronic devices capable of communicating with a central system, and even among themselves. A standard exists for this type of application, i.e., "ARINC 629."

A number of architectures have been disclosed in the prior art.

European Patent Application No. EP-A- 0 053 638 (THE BOEING COMPANY) discloses a communications bus utilizing a so called "current mode" bus, which uses a twisted pair.

The frequencies employed are of several MHZ only. The performance of the bus described is thus closer to the low-frequency than to the high-frequency range.

European Patent Application No. EP-A-0 282 102 (THE BOEING COMPANY) discloses a bus incorporating a magnetic coupling utilizing a twisted pair. The signals used are of the pulsed "dipole" type (see, most especially, FIG. 14 ("DT Signals") in this patent application; i.e., signals having a positive and negative component. These pulses correspond to data-signal transitions.

European Patent Application No. EP-A-0 282 101 (THE BOEING COMPANY) discloses a similar bus, and, more particularly, the coupling section of this bus and the related electronics.

Removable couplers which can be attached permanently or temporarily at any point on the bus have also been suggested. As regards the operating principle underlying them, these couplers are similar to "ammeter clamp"-type devices. These couplers are disclosed, in particular, in the following two patent documents:

U.S. Pat. No. US-1-4,906,879 (AMP Inc.); and

Patent Application No. EP-A-0 473 336 (AMP Inc.).

To place a coupler along the bus, it is sufficient to spread apart the strands of the pair at the point of insertion, to open the clamp forming the coupler, and to reclose the magnetic circuit of this clamp so as to grip one of the two strands. This strand then constitutes the primary winding of a transformer, whose secondary winding forms an integral part of the clamp-coupler.

Although seemingly attractive, this method nevertheless entails problems.

In the first place, spreading apart of the strands of the pair creates long-lasting interference in the connection area, in particular a variation of the characteristic impedance.

A signal-reversing system must be provided. In fact, it is difficult, if not impossible, to determine the "phase" of the primary signal. As shown in FIGS. 1a and 1b, the clamp-coupler $P_i$ may enclose the strand $b_1$ (FIG. 1a) or the strand $b_2$ (FIG. 1b) of the twisted pair $P_i$. At a given moment, as shown in the figures, the current I flows from left to right in the strand $b_1$, and from right to left in strand $b_2$. Clearly, the phase of the output signals $V_s$ of the clamp $P_i$ will be reversed, depending on whether it is connected to the strand $b_1$, or the strand $b_2$. Accordingly, it is necessary to provide electronic circuits permitting management of this circumstance, thereby complicating the interface circuits associated with the coupler and, naturally, increasing the price of these circuits. Furthermore, any increase of complexity adversely affects reliability.

Examination of the drawings of the aforementioned documents also shows that the structure of the clamp-coupler is complex, thus giving rise to a high cost price.

Other disadvantages are linked to the structure of couplers comprising two separate parts. It is not possible to guarantee the constancy of the parameters associated with the magnetic circuit (permeability, etc.) when the clamp is reclosed. The characteristic impedance of the coupler depends on the final installer. Losses cannot be controlled (possible dirt accumulation in the air gap) and cause excessive energy consumption, thereby producing unusable heating. This condition leads, once again, to lowered reliability.

Most frequently, the bus must be shielded, thereby making connection of the clamp-coupler difficult.

Finally, experience has shown that, over the life of an airplane, it was extremely rare that the position of a coupler had to be changed along the bus, or even to add any couplers.

SUMMARY OF THE INVENTION

The invention concerns a bus incorporating a magnetic coupling carrying pulsed "dipole" type signals similar to those utilized in the aforementioned EP-A-0 282 101 and EP-A-0 282 102.

The invention is intended to remedy the disadvantages of conventional buses, certain of which have been summarily described.

According to a first major feature of the invention, the "cable" (flexible) parts of the bus are disassociated from the "coupler" elements.

According to a second important feature of the invention, the bus architecture is entirely modular. The bus incorporates flexible cable sections and modules for interconnection between sections, over which the "subscribers" connect with each other by means of additional flexible cables. The "subscribers" are physically constituted by sub-systems of electronic instruments, or, at minimum, those comprising electronic interface and/or control circuits. These devices may include measuring instruments, sensors, actuators, etc.

An end-load module is connected to the last interconnection block.

The interconnection blocks actually comprise two parts, i.e., a module for magnetic coupling with the bus and comprising only passive components, and a module incorporating the requisite interface electronics, which is positioned between the subscriber cables and the magnetic coupling module.

The interconnection blocks may be single (individual) or multiple. In this latter case, the modules will advantageously be standardized. The "subscribers" are then connected using the supplementary cables by means of clusters.

Finally, these individual or multiple modules can be arranged in a cascade configuration.

Accordingly, the invention concerns a communications bus architecture, in particular for use in airborne applications, the bus being of the magnetic coupling type and comprising magnetic coupling and interface devices between the bus, which carries data signals, and "subscribers" connected to this bus. The bus is structured in sections and incorporates, in a cascade configuration, a series of cable sections forming the bus and a series of modules for interconnection of these sections. The "subscribers" are connected to the bus by means of the interconnection blocks and the latter incorporate magnetic coupling circuits which ensure continuity of the bus and of the electronic interface circuits arranged between the magnetic coupling circuits and these "subscribers."

The architecture according to the invention offers a very high degree of flexibility, by virtue of its modular structure.

It allows the cost price to be lowered, because of the aforementioned standardization.

The fact that the "cable" elements are disassociated from the coupler elements makes it possible to obtain uniform impedance, which is strictly checked at the factory. Similarly, the "coupling block" elements may have variable impedance which can nevertheless be checked at the factory. As a result, whole pre-equipped sections can be produced.

BRIEF DESCRIPTION OF THE DRAWINGS

The invention will be better understood, and other features and advantages will emerge, from a reading of the following description provided with reference to the attached drawings, in which:

FIG. 8 illustrates one example of a device for attachment of the interconnection blocks according to the invention.

DESCRIPTION OF PREFERRED EMBODIMENTS

In the following description, consideration is given to the preferred application of the invention, i.e., avionics, unless otherwise indicated.

Figure 2:
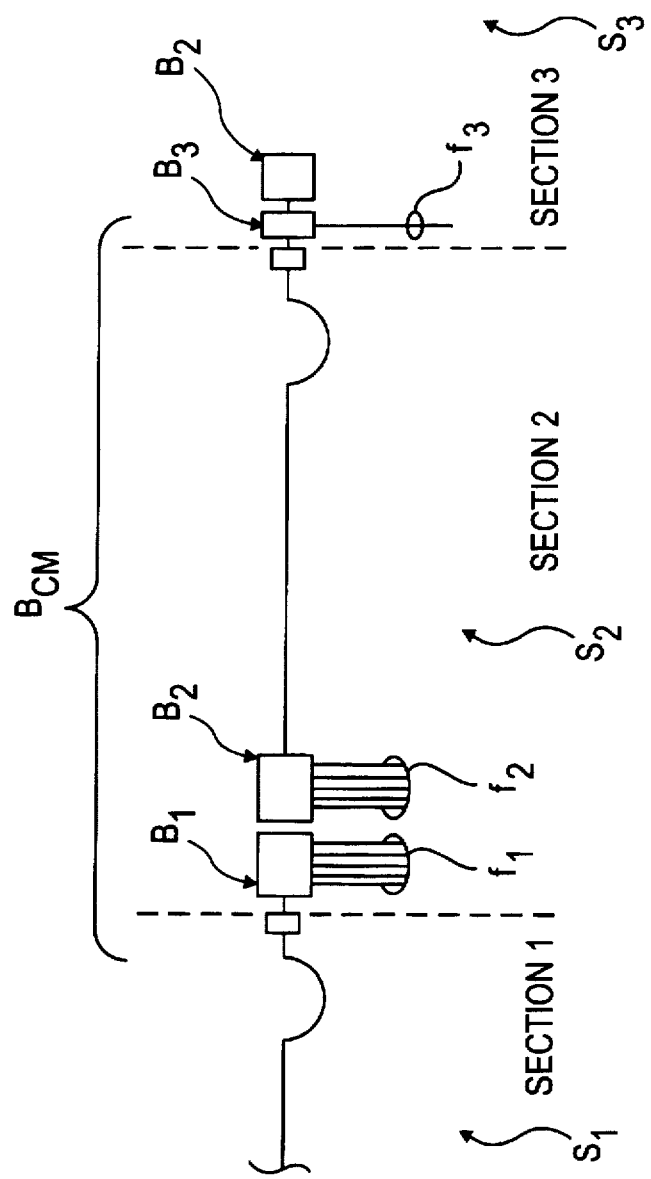
FIG. 2 illustrates schematically the overall architecture of a magnetic coupling bus according to the invention.

FIG. 2 illustrates schematically the overall architecture of a bus incorporating magnetic coupling $B_{CM}$ according to the invention.

According to one of the main features of the invention, the "transmission cable" and "coupler element" components are disassociated on the bus $B_{CM}$. As a result, the bus $B_{CM}$ comprises multiple sections in a cascade configuration, three of which are shown in the example in FIG. 2, i.e., $S_1$ to $S_3$. Each section $S_1$ to $S_3$ is separated from the next one by an interconnection block $B_1$ to $B_3$ which couples the "subscriber" cables, i.e., the cables from the electronic device sub-systems, to the bus $B_{CM}$.

As already indicated, these modules $B_1$ to $B_3$ are, in turn, divided into two distinct parts, a magnetic coupling module and a module containing the electronic interface. Furthermore, they can incorporate a number of variants, to be described in detail below.

In the example shown in FIG. 2, the sections $S_1$ and $S_2$ are interconnected using two multiple interconnection blocks $B_1$ and $B_2$, which are arranged in a cascade configuration. "Subscribers" (not shown) are connected in a "cluster" configuration to these interconnection blocks $B_1$ and $B_2$ by means of two cable bundles, $f_1$ and $f_2$, respectively.

The sections $S_2$ and $S_3$ are interconnected by a single interconnection block $B_1$, section 3 (the final section) being reduced to a single end-load impedance module $B_2$ arranged in a cascade configuration with the interconnection block $B_3$. Similarly, the subscriber cable bundle $f_3$ is reduced to a single cable.

Figure 3:
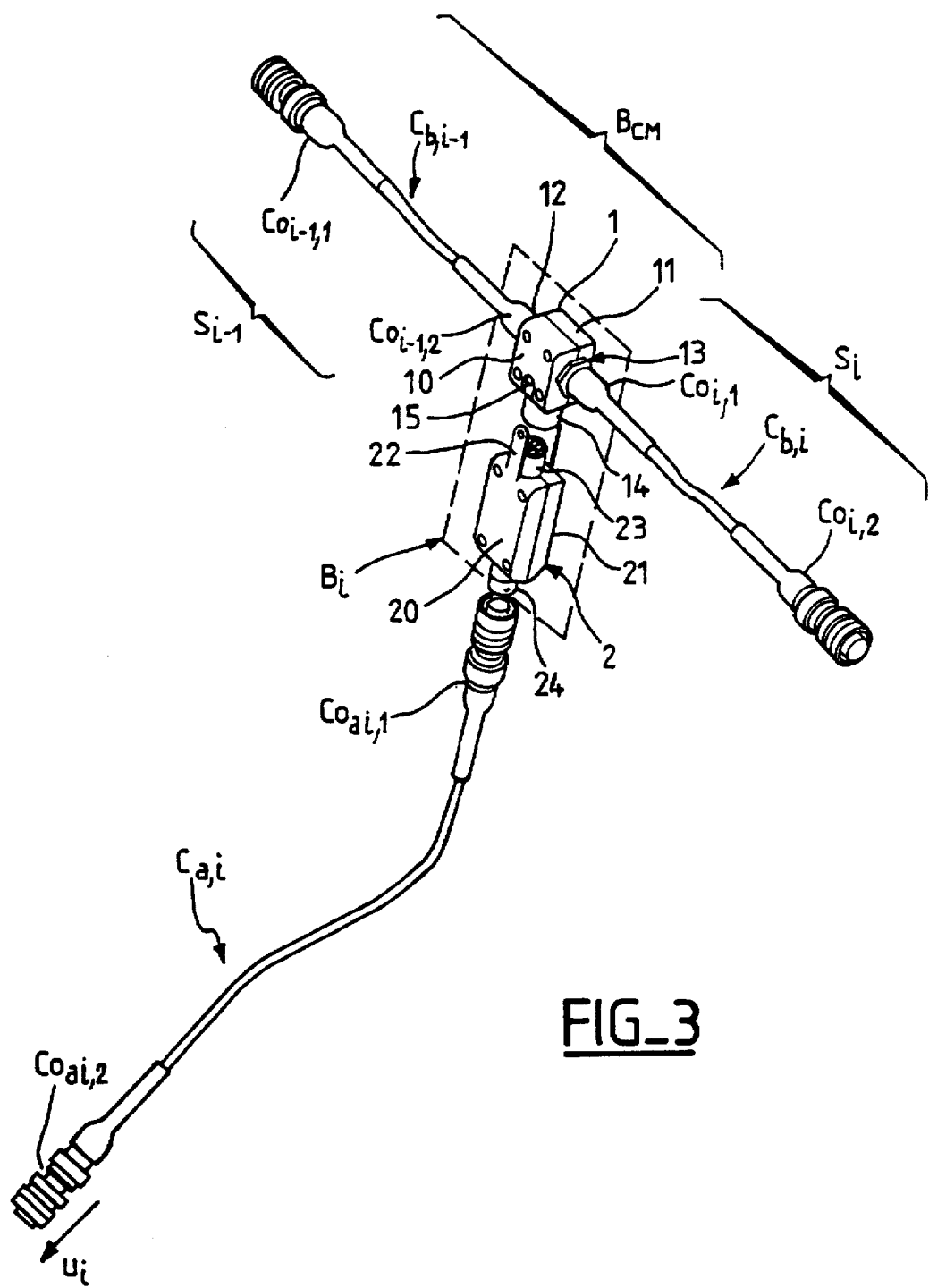
FIG. 3 is a perspective view of two consecutive sections of such a bus and of an individual interconnection block conforming to a first variant.

FIG. 3 illustrates a first exemplary embodiment of an individual interconnection block $B_i$, i.e., a block permitting the coupling of a single "subscriber" cable $U_i$ with the bus $B_{CM}$. The figure illustrates two successive sections of the bus $B_{CM}$ having the arbitrary positions $S_{i-1}$ and $S_i$.

The interconnection block $B_i$ comprises a magnetic coupling module 1 and an interface module 2.

Advantageously, the magnetic coupling module 1 contains only passive components, i.e., mainly conductors and magnetic circuits, for example ferrite cores (not shown).

The configuration of the circuits belonging to the coupler itself may be diverse and does not constitute directly a feature of the invention. The design of the coupler is within the abilities of those skilled in the art, who are familiar, in particular, with the requirements of the aforementioned standard and the characteristics specific to a given application: i.e., r.m.s. value of the current carried by the bus $B_{CM}$, frequency, number of branches, i.e., subscribers, characteristic impedance, etc. They may, moreover, be completely similar to the circuits according to the prior art.

In the example shown, the coupling module 1 physically comprises two half-casings 10 and 11, which are attached using any suitable means, i.e., screws, etc. The overall shape is advantageously a rectangular parallelepiped, for reasons that will emerge below. It comprises, in standard and symmetrical fashion, an input connector 12 (female in the example shown), and a male output connector 13 used in interconnections with the bus $B_{CM}$. More precisely, interconnections are produced, at the input, using the cable $C_{b,i-1}$ in the section $S_{i-1}$, and, at the output, using the cable $C_{b,i}$ in section $S_i$. It further comprises an additional, female connector 14 (In the example shown).

Advantageously, the casing 1 is made of an electricity-conducting, magnetic material, in order to ensure, first, electric continuity between the inputs and outputs, and second, high magnetic compatibility (screening). The connectors 12 to 14 constitute partition feed-through devices.

In the example illustrated, the interface module also consists of two half-casings 20 and 21 joined using any suitable means, i.e., screws, etc. The overall shape is advantageously a rectangular parallelepiped, as is the case for module 1. Inside this module 2 are arranged the electronic circuits (not shown) required for detection by the magnetic coupling module 1 of the signals carried over the bus $B_{CM}$ and for the conversion thereof, in a suitable form, into signals transmitted over the cable $C_{a,i}$ belonging to the "subscriber" $U_i$. Of course, these circuits provide for reverse conversion if the coupling is two-directional. Like the coupler circuits, these circuits do not directly form a component of the invention, but the design thereof lies within the abilities of those of ordinary skill in the art. They may, moreover, be entirely similar to the circuits according to prior art, in particular those described in the aforementioned European patent applications.

Figure 1A:
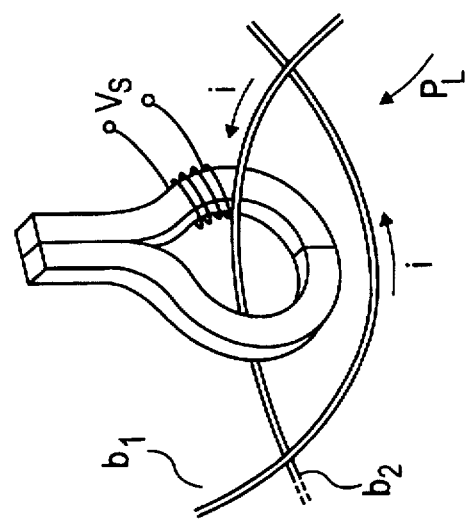
FIGS. 1a and 1b illustrate the installation of a coupler according to prior art on a bus incorporating a twisted pair.
Figure 1B:
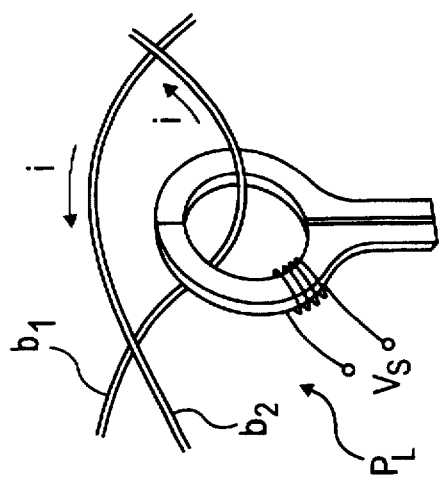

The module 2 also comprises an input connector 23 (male in the example shown), which is designed to be coupled to the connector 14 belonging to the module 1. The output signals delivered by the magnetic coupling circuits, i.e., signals similar to the signals $V_S$ in FIG. 1, are transmitted over suitable contact elements belonging to the connector 14, and they function as input signals for the electronic circuits of the module 2 when the latter is coupled. As indicated above, the reverse linkage (two-directional coupling) may also be effected using these circuits.

Each of the two half-casings 20 and 21 forming the module 2 advantageously comprise attachment tabs 22 allowing the module 2 to be fastened to the module 1 when the connector 13 and 14 are coupled. To this end, the module 1 also comprises means 15, e.g., threaded holes, which allow this attachment. This arrangement could, of course, be reversed, in which case the casing 1 incorporates the attachment tabs.

Finally, the module 2 comprises a connector 24 designed to be coupled to the cable $C_{a,i}$ belonging to the "subscriber" $U_i$.

The two-module structure proves advantageous for several reasons.

The passive elements are generally highly reliable and can be completely standardized from one magnetic coupling module to another. As described below, the magnetic coupling module can be made fixed and permanently mounted.

The interface module 2, which comprises active elements, in particular integrated circuits, may be specific to the needs of a "client" $U_i$. As one example, it may provide for two-directional conversions of the signals, or, to the contrary, one-directional conversions in one direction or another ("subscriber" $U_i$ toward the bus $B_{CM}$, or vice-versa). Advantage is gained by providing a cover or making the two half-casings detachable, thereby allowing access to the internal electronics.

Figure 4:
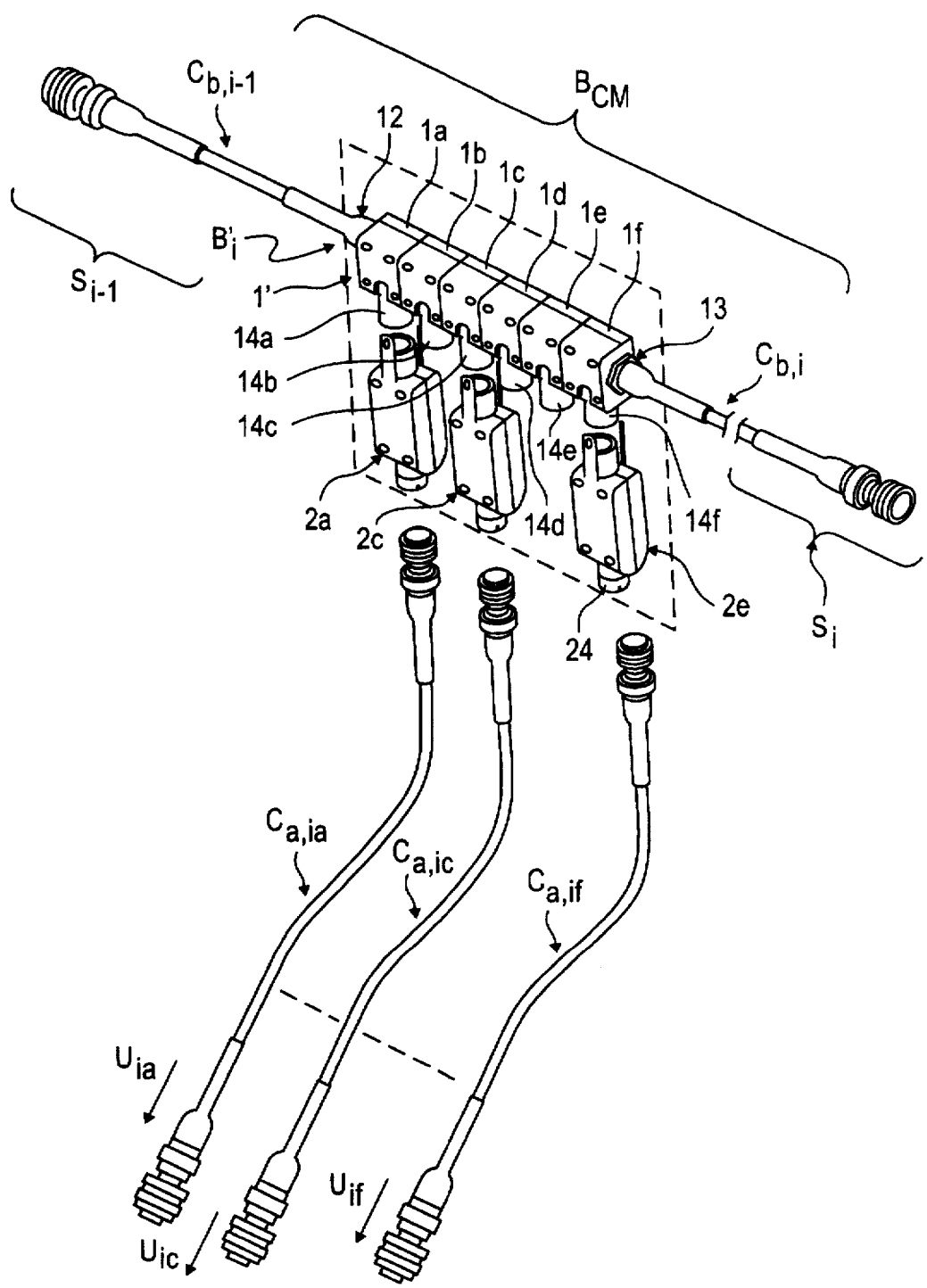
FIG. 4 is a perspective view of two consecutive sections of a bus of this kind, as well as of a series of individual interconnection blocks arranged in cascade.

FIG. 4 is a perspective view of two consecutive sections of a bus $B_{CM}$ and of a composite unit $B'_i$, which functions as a multiple interconnection block between the bus $B_{CM}$ and multiple "subscribers."

In this figure, only components essential for proper understanding of the invention have been referenced, it being understood that the elements described in detail are identical to those described previously, only the identified exceptions differing therefrom.

As in the case of an individual interconnection block, the composite module $B'_i$ consists of two distinct modules, or, more precisely, two series of modules, i.e., magnetic coupling modules, each of which is similar to those previously described and referenced as $1_a$ to $1_f$ and arranged in a cascade configuration. The combination of the modules mounted in cascade constitutes a one-piece casing.

Functionally, each module $1_a$ to $1_f$ is strictly identical to the module 1 in FIG. 3. The only noteworthy difference between the latter modules and module 1 lies in the fact that only the lateral modules $1_a$ to $1_f$ are fitted with connectors 12 and 13 designed to ensure coupling with the cables $C_{b,i-1}$ and $C_{b,i}$, respectively, of the bus $B_{CM}$. On the other hand, all of the modules $1_a$ to $1_f$ are equipped with a connector $14_a$ to $14_f$ to ensure coupling with the "subscriber" cables by means of interface modules $2_a$ to $2_f$, respectively. In the example shown, in order not to overload the drawing, only three interface modules $2_a$, $2_c$, and $2_f$ and three subscriber cables $Co_{a,i}$, $Co_{a,ic}$, and $Co_{a,if}$ have been illustrated. These cables $C_{a,ia}$, $C_{a,ic}$, and $C_{a,if}$ serve the subscribers $U_{ia}$, $U_{ic}$, and $U_{if}$.

All of the interface modules $2_a$ to $2_f$ may be identical to each other and, structurally and functionally, to the module 2 in FIG. 3. Of course, as indicated above, the possibility of adapting each interface module to the specific needs of the user remains intact.

Advantageously, the magnetic coupling modules 1' interposed on the bus $B_{CM}$ are standardized and comprise, for example, 6 or 12 elementary modules. The module $B'_i$ incorporates six modules in the example shown. The "subscribers" $U_{ia}$ to $U_{if}$ are thus connected in "clusters" to this interconnection block $B'_i$. Furthermore, it is not necessary that the number of "subscribers" be equal to the maximum possible number of connections, i.e., six in the example shown. The "subscriber" cables and the interface modules may be connected to any of the connectors $14_a$ to $14_f$, if all of the modules are identical. As regards structure, the sizes of the casings are advantageously identical and determined suitably so that they can be positioned side by side, without hindering connection of the adjacent module. In this regard, a rectangular parallelepiped shape appears to be the optimal one. In conventional fashion, if different types of interface modules are used, from a functional standpoint, marking or the use of a different color, for example, is sufficient.

In the two embodiments just described, all of the connectors are advantageously circular, threaded, or bayonet-equipped. FIG. 3 shows that this arrangement allows endto-end shielding (continuity) and controlled impedance between the different sections $S_{i-1}$ and $S_i$ of the bus $B_{CM}$, on the one hand, and between this bus and the "subscriber" interfaces $U_i$ (not shown).

The bus cables $C_{b,i-1}$ and $C_{b,i}$ are shielded dual-conductor cables. The subscriber cables are advantageously shielded four-conductor cables.

Each cable $C_{b,i-1}$ and $C_{b,i}$, comprises an "input" connector $Co_{i,1}$, and $Co_{i,1}$, and an "output" connector, $Co_{i-1,2}$ and $Co_{i,2}$, respectively. These connectors are male and female alternatively, or, to the contrary, of a single type on one cable section. The connectors 12 and 13 on the magnetic coupling modules 1 are, of course, paired with these connectors. Similarly, the "subscriber" cables are fitted with a pair of similar connectors, referenced as $Co_{ai,1}$ and $Co_{ai,2}$. The cables are protected with sheaths, advantageously thermoplastic, which are extended by sleeves which cover the rear of the connectors. In general, shielding is accomplished using braids. The braids are continued on the connector bodies to ensure the aforementioned mass electrical continuity.

The casings of the modules 1 and 2 are made either of metal or of a heat-molded and metallized plastic material, in order to ensure the aforementioned electrical continuity of the mass and shielding.

A second embodiment of the multiple interconnection block will now be described with reference to FIGS. 5, 6a, and 6b.

Figure 5:
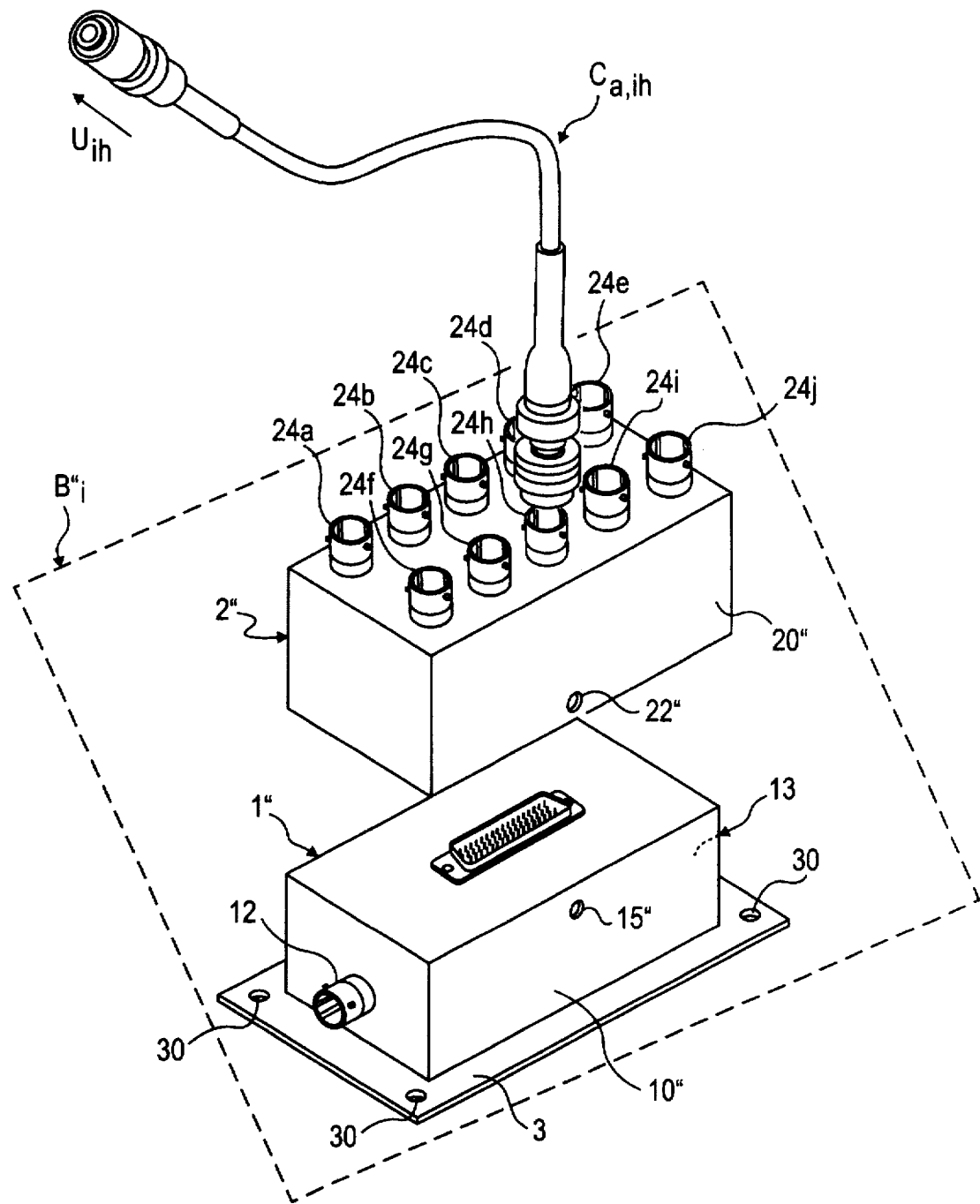
FIG. 5 is a perspective view of two consecutive sections of a bus of this kind and of a multiple interconnection block conforming to a first variant.

The block B"$_I$ shown in FIG. 5 in a perspective top view comprises, as before, two parts: a magnetic coupling module 1" constituted by passive components, and an interface module 2" incorporating the active components (interface electronics).

The basic difference as compared with the embodiment in FIGS. 3 and 4 is that the two modules are constituted by one-piece casings.

The casing 10" of the magnetic coupling is advantageously attached to a flat support 3 comprising means 30 for attachment (e.g., holes allowing attachment using a conventional screw-nut system, not shown) to a structure (not shown in this figure).

Another major difference lies in the fact that the connectors coupling with the interface module 2" are replaced by a single rectangular multi-contact connector $C_o$, which is similar to the "parallel port"-type, or "RS232" connectors used in computer applications. This connector $C_o$, comprises, in conventional fashion, a base and a metal skirt enclosing the signal-input/output contact elements and forming the shielding. Electrical continuity of the mass can be guaranteed using one of the electrical contact elements.

The connectors 12 and 13 (the latter not being shown in the figure) for coupling with the bus $B_{CM}$ (FIGS. 3 and 4) are of the same type as previously cited, i.e., circular.

Figure 6A:
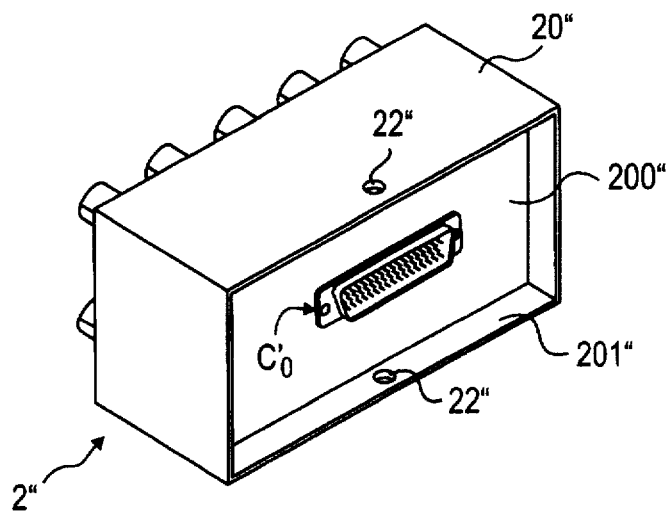
FIGS. 6a and 6b are perspective views of the coupling module, a component of the interconnection block in FIG. 5, seen in top and bottom views, respectively.
Figure 6B:
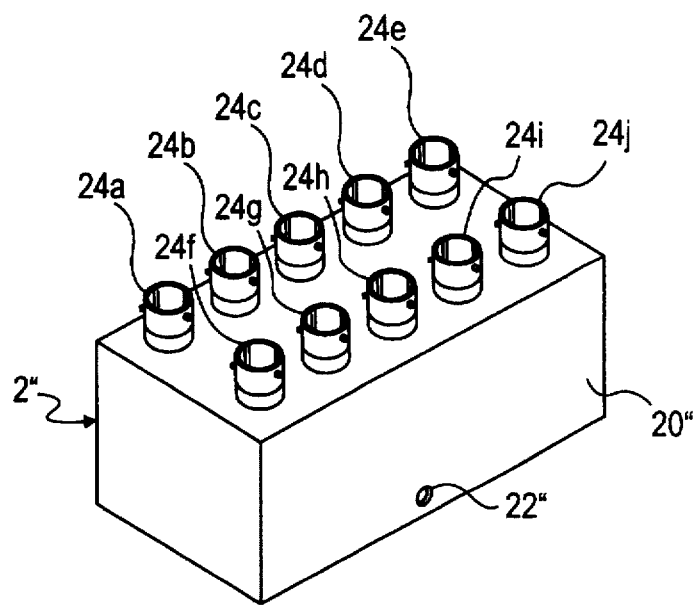

FIGS. 6a and 6b show in perspective the casing 20' forming the interface module 2", seen from the bottom and top, respectively.

Coupling with the "subscriber" cables $U_{ih}$, of which one $C_{a,ih}$ has been simplified in the figure, is ensured by circular connectors $24_a$ to $24_j$, as before. The basic difference lies in the fact that the connectors coupling with the magnetic coupler module are replaced by a single connector $C'_o$, which is, of course, paired with the connector $C_o$, in order to allow the connectors to be fitted into each other.

Advantageously, the walls 201" extend beyond the lower plane 200" or bottom of the casing 20", forming a skirt allowing insertion of the casing 20" on the casing 10". The dimensions of the two casings are determined appropriately so as to allow insertion with abutting edges. Attachment means, 22" on the casing 20" and 15" on the casing 10", complete the assembly. These means perform a function similar to that of the attachment means 15 and 22 (FIG. 3). They may simply be holes allowing conventional screw-nut attachment.

The assembly just described thus makes it possible to serve a maximum number n of "users," ten users in the example illustrated.

A priori, the magnetic coupling module 10" is permanently attached. Only the interface module 20" and/or the cables $C_{a,ih}$ belonging to the "subscribers" $U_{ih}$ can be detached.

According to a first variant, all of the inputs/outputs (connectors 24a to 24j) are functionally identical. The cables $C_{a,ih}$ can then be connected in random fashion to any connector whatever. According to a second variant, the internal electronics ensures specialized interfaces specific to each user. It is then necessary to provide for a discriminating, or indexing, system, or at least an unambiguous marking system, thus rendering the physical structure more complex. The modular aspect (standardization) is also reduced in scope, at the same time that it yields greater functional flexibility.

Figure 7:
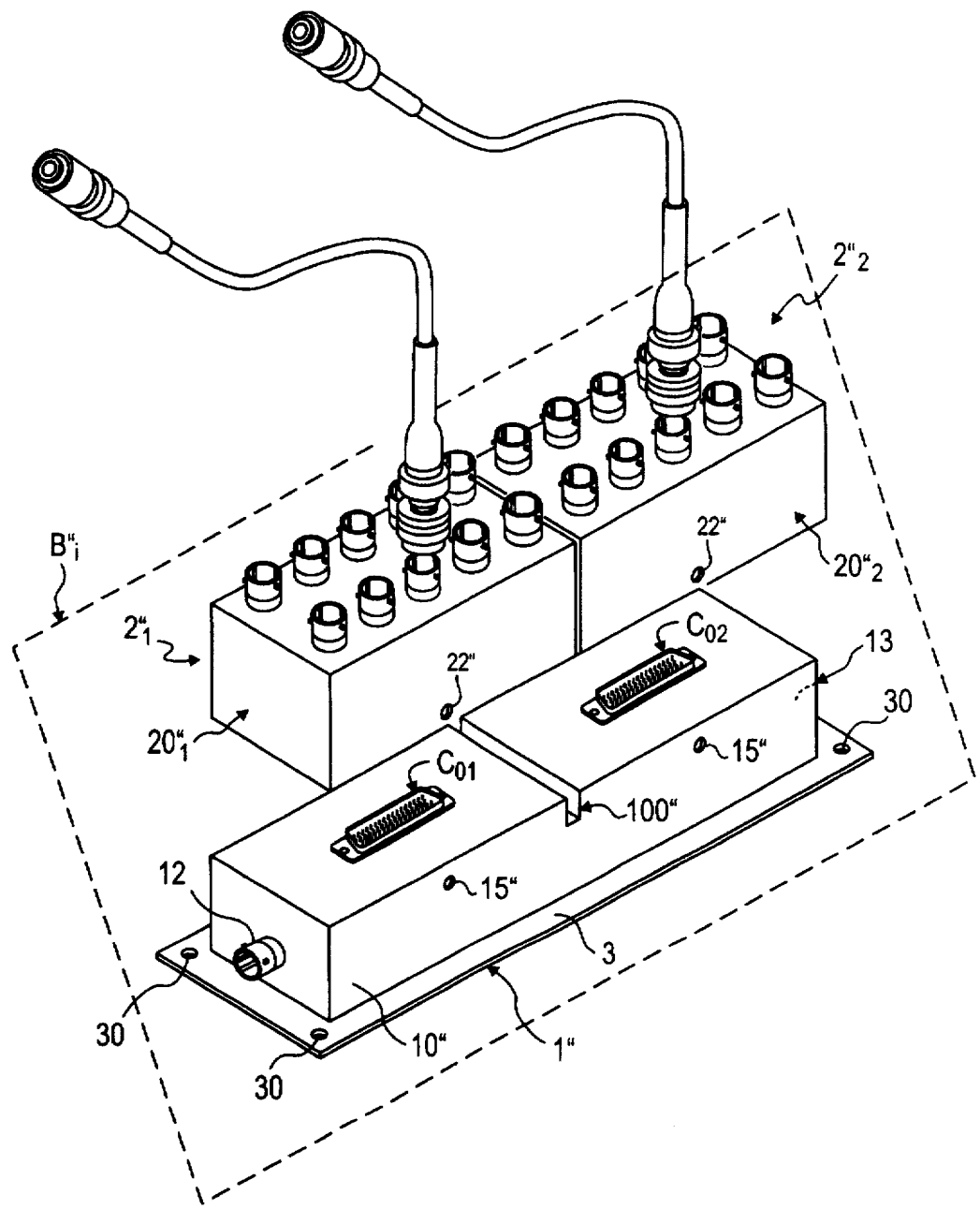
FIG. 7 is a perspective view of a multiple interconnection block conforming to a second variant.

FIG. 7 illustrates a variant of this embodiment. The interconnection block B'"$_I$ always comprises two parts; however, the magnetic coupling module 1'" is constituted by a dual casing 10" and comprises two rectangular connectors $C_{O1}$ and $C_{O2}$. This structure makes it possible to insert two interface modules, 2"$_1$ and 2"$_2$, which are structurally identical to the module 2" in FIGS. 5, 6a and 6b.

To allow insertion of the two interface modules 2"'$_1$ and 2"'$_2$ and to permit use of only a single casing model, a central groove 10"' is provided, this groove having a width and depth sufficient to allow simultaneous insertion of the two lower skirts (FIG. 6a: 201") of the casings belonging to the modules 2"$_1$ and 2"$_2$.

This variant makes it possible to accommodate 2×n "subscribers," or twenty "subscribers" in the example illustrated. Of course, it is possible to provide triple, quadruple, or higher-order modules.

As before, the magnetic coupling module 1'" rests on a flat support 3 which allows it to be mounted on an external structure (not shown). The casing 10"' is also fitted with attachment means 15'" for mechanical coupling to the casings 20"$_1$ and 20"$_2$ (attachment means 22").

A description will now be provided, with reference to FIG. 8, of a structure allowing permanent fastening of the magnetic coupling modules, for example, in the superstructure of an airplane. In the example shown in this figure, it is presumed that the magnetic coupling module is of the type described with reference to FIG. 3. This type of attachment also proves suitable, by extension, to the multiple coupling module described with reference to FIG. 4.

The device basically comprises a shaped rail 4 incorporating an elongated body 40. This body is provided with elongated slots 41 spaced evenly over its length and with a longitudinal groove 42.

The casings 10 of the magnetic couplers 1 are fitted on one of their faces with a welded nut 101 or equivalent element, e.g., threaded hole, etc., whose dimensions match the depth and width of the aforementioned groove 42. By means of this structure, the nut 101 may be inserted in the groove 42, thereby permitting the translational motion of the magnetic coupling module 1 along the rail forming a slide-track and the attachment thereof in a desired area. To this end, it suffices to use a screw 5 inserted in one of the slots 41, which, when screwed in, immobilizes the magnetic coupling module 1 in the desired position.

The coupling modules according to the second variant (FIG. 5 to 7) are advantageously mounted on a flat support 3 allowing immediate screw attachment to an exterior structure (not shown). In an assembly variant (not shown), these supports can also be installed on two rails, similar to the rail 4 in FIG. 8, and arranged parallel to each other and spaced apart by a distance corresponding to the spacing of the holes 30 in the plates 3. Attachment may then be conventionally achieved using screw-and-nut combinations.

Preferably, these assembly structures are placed at earth potential.

In all of the embodiments described, the bus $B_{CM}$ is supplemented, in its last section, by an end-load module $B_Z$, as illustrated in FIG. 2. This module is the sole module of its type for the entire bus $B_{CM}$ and specific thereto. It encloses the bus on a determinate impedance. Structurally, it may be produced as a casing similar to the casing 10 belonging to the magnetic coupling module 1 in FIG. 3. It connects with the connector 13 of the last magnetic coupling module of the bus $B_{CM}$, whether this is a single coupling module as illustrated in FIG. 2 (and belonging to the interconnection block B3, in the example shown in this figure), or a multiple coupling module, such as those shown in FIGS. 4 to 7.

Typically, the characteristic impedance of the buses of the type described is approximately $130\Omega$. Depending on the applications, the end load will be made suitable or not suitable and set at a predetermined value by calculation or experimentation (for example, as a simulation product).

The disassociation of the "cable" and the "coupler" elements makes it possible to control rigorously the impedance of the cables during manufacture. The "coupling modules," which are themselves made in two parts, can also be pre-equipped and checked at the plant. Furthermore, the interface modules may be adapted to meet the specific needs of the various "subscribers" to be connected to the bus.

The invention permits a highly modular structure and a very high level of standardization of the bus components. These components are reduced to a small number of distinct components: cable sections constituting the bus and used to connect the "subscribers," single or multiple magnetic coupling and interface modules (which can themselves be standardized) in accordance with two principal embodiments), and a single bus end-load module.

The precisions supplied with regard to the number of subscribers connected to the multiple interconnection blocks, the number of bus sections, the characteristic bus impedances, and the type of materials used have been given only to focus thinking more effectively, and should not be considered to limit in any way whatever the scope of the invention.

It is also clear that, although suited in particular for avionics and aerospace applications, the invention cannot be restricted to these applications alone.

What is claimed is:

1. Communications bus architecture, the bus ($B_{CM}$) being of the magnetic coupling type and comprising magnetic coupling and interface elements between said bus ($B_{CM}$) carrying data signals and "subscribers" ($U_i$) connected to this bus, wherein said bus is structured in sections ($S_1$ to $S_3$) and comprises, in a cascade configuration, a series of cable sections ($C_{b,i-1}$, $C_{b,i}$) forming the bus ($B_{CM}$) and interconnection blocks ($B_i$) belonging to these sections, wherein said "subscribers" ($U_i$) are connected to the bus ($B_{CM}$) by means of the interconnection blocks ($B_i$) and wherein the latter comprise magnetic coupling circuits (1) ensuring continuity of said bus ($B_{CM}$) and of electronic interface circuits (2) arranged between the magnetic coupling circuits and said "subscribers" ($U_i$).

2. Architecture according to claim 1, wherein the "subscribers" ($U_i$) are connected to said interconnection blocks ($B_i$) by means of additional cables ($C_{a,i}$).

3. Architecture according to claim 1, wherein said interconnection blocks ($B_i$) are composed of a first module (1) constituted by said magnetic coupling circuits and of a second module (2) constituted by said electronic interface circuits, and wherein these two modules (1, 2) are interconnected electrically by means of first connectors (14, 23), so as to couple magnetically said "subscriber" ($U_i$) to said cable ($B_{CM}$).

4. Architecture according to claim 3, wherein said cables ($C_{b,i-1}$, $C_{b,i}$) forming the bus ($B_{CM}$) are fitted at their ends with connectors ($Co_{i-1,1}$, $Co_{j-1,2}$, $Co_{i-1}$, $Co_{i,2}$) and wherein said first module (1) comprises second (12) and third (13) connectors designed to interconnect electrically this module (1) to said cables ($C_{b,i-1}$, $C_{b,i}$) forming the bus ($B_{CM}$), by means of the end connectors ($Co_{i-1,1}$, $Co_{j-1,2}$, $Co_{i,1}$, $Co_{i,2}$).

5. Architecture according to claim 3, wherein said additional cables ($C_{a,i}$) for connection to the subscribers ($U_i$) are fitted at their ends with connectors ($Co_{ai,1}$, $Co_{ai,2}$), and wherein said second module (2) comprises an additional connector designed to interconnect electrically this module (2) to said additional cables ($C_{a,i}$).

6. Architecture according to claim 4 or 5, wherein said first (1) and second (92) modules are constituted by casings (10, 20) of a substantially rectangular parallelepiped shape and wherein casings (10, 20) are fitted with additional fastening means (15, 22) attaching one to the other.

7. Architecture according to claim 6, wherein said first module (1') is constituted by a series of elementary casings in a cascade configuration ($1_a$ to $1_f$) forming a multiple magnetic coupler module, so as to magnetically couple multiple "subscribers" to said bus ($B_{CM}$), wherein lateral casings ($1_a$ to $1_f$) are alone fitted with said second (12) and third connectors (13) for interconnection of this multiple magnetic coupling module (1') to said bus ($B_{CM}$), and wherein each of the elementary casings ($1_a$ to $1_f$) is fitted with an additional connector ($14_a$ to $14_f$), each of which allows electrical interconnection with an elementary interface module ($2_a$ to $2_f$) and coupling with an equal number of "subscribers" ($U_{ia}$, $U_{ic}$, $U_{if}$) by means of said additional cables ($C_{a,ia}$, $C_{a,ic}$, $C_{a,if}$).

8. Architecture according to claim 4 or 5, wherein the connectors (12, 13, 14, 23, 24) of said first (1) and second (2) modules, as well as the connectors (($Co_{i-1,1}$, $Co_{i-1,2}$, $Co_{i,1}$, $Co_{i,2}$, $Co_{ai,1}$, $C_{ai,2}$) of said cables ($C_{b,i-1}$, $C_{b,i}$) forming the bus ($B_{CM}$) and circular connectors, wherein the cables are provided with shielding and wherein said connectors ensure electrical continuity of said shielding.

9. Architecture according to claim 6 including means (5, 101) for attaching the casings (10) of said first modules (1) in a determinate area of a rail (4) forming a slide-track (42).

10. Architecture according to claim 4 or 5, wherein said interconnection block ($B''_i$) comprises a first one-piece casing (10") constituting a multiple magnetic coupler module (1") fitted with said second (12) and third connectors (13) for electrical interconnection with said bus ($B_{CM}$), and at least one second one-piece casing (20") constituting a multiple electronic interface circuits module (2") fitted with a plurality of circular connectors ($24_a$ to $24_j$), to each of which is interconnected electrically a specific "subscriber" ($U_{ih}$) by means of said supplementary cables, and wherein said first casing (10") is equipped with at least one rectangular multi-contact connector ($C_o$) and said second casing (20") is equipped with an additional rectangular multi-contact connector ($C'_o$), these connectors ($C_o$, $C_o'$) allowing electrical interconnection of the first (1") and second (2") casings by means of insertion.

11. Architecture according to claim 10, wherein said first (10") and second (20") one-piece casings have a substantially parallelepiped shape, and wherein these casings are equipped with additional fastening means (15", 22", 201") allowing one to be fitted on the other, said additional rectangular multi-contact connectors ($C_o$, $C_o'$) being arranged on walls opposite the first (10") and second (20") casings to be fitted one on the other.

12. Architecture according to claim 11, wherein, in addition, the connectors of said cables forming the bus ($B_{CM}$) and of said additional cables ($C_{a,ih}$) are circular connectors, wherein the cables are provided with a shielding, and wherein said connectors provide electrical continuity of said shielding.

13. Architecture according to claim 11, wherein said first one-piece casing (10''') constituting a multiple magnetic coupler module (1''') is subdivided into at least two sub-assemblies, wherein each sub-assembly comprises a rectangular multi-contact connector ($C_{o1}$, $C_{o2}$), and wherein it is provided with transverse grooves (100''') delimiting two contiguous sub-units so as to allow the side-by-side insertion and fitting together of one-piece casings (20") constituting said multiple electronic interface circuits (2"), a first one-piece casing (20") being fitted on each of said sub-units.

14. Architecture according to claim 11 wherein the first casing (10", 10''') constituting said multiple magnetic coupling module (1", 1''') is equipped with a flat support (3) and wherein this flat support is fitted with means (30) for attachment to an external structure.

15. Architecture according to any of claims 1 to 5, wherein a last section ($S_3$) constituting said bus ($B_{CM}$) comprises an additional module ($B_Z$) forming the load impedance, and wherein this module is connected below the last of the interconnection blocks ($B_3$) so as to seal the bus ($B_{CM}$) on said impedance.

16. Architecture according to any of claims 1 to 5, wherein said casings (10 to 10''', 20 to 20''') forming the modules (1 to 1''', 2 to 2''') are produced by thermoplastic molding and metallization so as to ensure electrical continuity.

17. Communications bus architecture, the bus ($B_{CM}$) being of the magnetic coupling type and comprising magnetic coupling and interface elements between said bus ($B_{BM}$) carrying data signals and "subscribers" ($U_i$) connected to said bus, wherein said bus is structured in sections ($S_1$ to $S_3$) and comprises, in a cascade configuration, a series of cable sections ($C_{b,i-1}$, $C_{b,i}$) forming the bus ($B_{CM}$) and interconnection blocks ($B_i$) belonging to these sections, wherein said "subscribers" ($U_i$) are connected to the bus ($B_{CM}$) by means of the interconnection blocks ($B_i$) and wherein the latter comprise magnetic coupling circuits (1) ensuring continuity of said bus ($B_{CM}$) and of electronic interface circuits (2) arranged between the magnetic coupling circuits and said "subscribers" ($U_i$), wherein said interconnection blocks ($B_i$) are composed of a first module (1) constituted by said magnetic coupling circuits and of a second module (2) constituted by said electronic interface circuits, and wherein these two modules (1, 2) are interconnected electrically by means of first connectors (14, 23), so as to couple magnetically said "subscriber" ($U_j$) to said cable ($B_{CM}$), and wherein ends of cables ($C_{b,i-1}$, $C_{B,i}$) forming the bus ($B_{CM}$) are fitted with connectors ($Co_{i-1,1}$, $Co_{i-1,2}$, $Co_{i,1}$, $Co_{i,2}$), and wherein said first module (1) comprises second (12) and third (13) connectors designed to interconnect electrically said first module (1) to said cables ($_{b,i-1}$, $C_{b,i}$) forming the bus ($B_{CM}$), by means of said end connectors ($Co_{i-1,1}$, $Co_{i-1,2}$, $Co_{i,1}$, $Co_{i,2}$).

* * * * *